Feb. 22, 1949.   H. F. MINTER   2,462,209
RESINS AND CONDUCTORS INSULATED THEREWITH
Filed May 7, 1945

*Fig.1.*

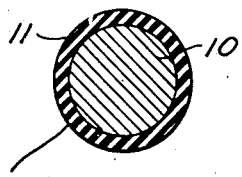

Insulating Coating Comprising Thermoset Polymer of an Acyl ester of Castor Oil and an alpha, beta-dicarboxylic acid half ester and a polymerizable monomer having the group $H_2C=C<$

*Fig.2.*

Fabric Coated with Thermoset Condensation Product of an Acyl ester of Castor Oil and an alpha, beta-dicarboxylic acid half ester and a polymerizable monomer having group $H_2C=C<$ WITNESSES:                    INVENTOR
                              Herbert F. Minter.
                              BY
                              Ezra W. Savage
                              ATTORNEY Patented Feb. 22, 1949

2,462,209

UNITED STATES PATENT OFFICE 2,462,209

RESINS AND CONDUCTORS INSULATED THEREWITH

Herbert F. Minter, Pittsburgh, Pa., assignor to Westinghouse Electric Corporation, East Pittsburgh, Pa., a corporation of Pennsylvania Application May 7, 1945, Serial No. 592,406

13 Claims. (Cl. 174—121)

This invention relates to synthetic resins and, more particularly, to flexible thermosetting resins having physical toughness, thermal stability, chemical inertness and low acidity.

It has been proposed heretofore to prepare thermosetting resins from "solventless" liquid compositions such, for example as glycol-maleates dissolved in monostyrene, that, when subjected to polymerization, completely polymerize to form resins having three dimensional cross linkages. However, these three dimensional molecular structures tend to be hard and somewhat brittle. For many applications, it is desirable to produce thermosetting resins of this nature that are flexible and tough, in order to withstand the requirements of commercial applications. Thermosetting resins have been plasticized by mechanically admixing a flexibilizing material, such as an oil, or rendered more plastic by adjusting the proportions of the reactants to minimize the three dimensional cross linking. Both of these latter expedients have been found unsatisfactory in practice. Unreacted oils in some cases have been found to be subject to fungus growths, or other deterioration due to natural causes. In many cases, the flexibility is temporary, disappearing upon the oxidation or evaporation of the oil or other plasticizing agent.

In the case where the thermoset product is rendered somewhat softer or more plastic by modifying the proportions of the ingredients to minimize three dimensional cross linking, the final products often tend to be thermoplastic in nature, or even cheesey in structure, so that mechanical strength and infusibility is lacking. Plasticity secured at the expense of thermosetting characteristics is undesirable.

According to the present invention, it has been found possible to provide an internally plasticized molecular structure which is thermosetting in nature and possessed of many characteristics heretofore regarded as highly desirable in the resin art.

The object of this invention is to provide a permanently flexible thermosetting resin characterized by outstanding toughness and a high thermal stability.

Another object of the invention is to provide a liquid resin composition capable of completely polymerizing into a permanently flexible thermoset composition.

A still further object of the invention is to provide for preparing members by applying to base materials a liquid completely reactible thermosetting composition which is internally plasticized, whereby the resulting thermoset polymer is permanently flexible.

Other objects of the invention will, in part, be obvious and will, in part, appear hereinafter. For a better understanding of the nature and objects of the invention reference should be had to the following detailed description and drawing in which Fig. 1 is an enlarged vertical cross-section, and Fig. 2 is an enlarged cross-section through a coated sheet.

According to my invention, I initially react castor oil with a long carbon chain acyl chloride to esterify one or more of the hydroxyl groups in the castor oil molecule. The acyl groups function as permanent plasticizers for the ultimate resinous products to be produced from the castor oil ester. Thereafter, the castor oil acyl ester is reacted with an olefinic alpha, beta-dicarboxylic acid, such as maleic anhydride to replace all or at least sufficient of the remaining hydroxyl groups in the castor oil whereby a major proportion are esterified by forming the castor oil half-ester of the unsaturated dicarboxylic acid. The resulting product is a viscous or sirupy material that is readily soluble in a liquid monomer having the group $H_2C=C<$, especially vinyl monomers, to form solutions of a relatively low viscosity. These solutions may be readily applied to members of all kinds as impregnants, coatings, films, and adhesives; or the liquid solutions may be cast in molds of any predetermined shape and, when subjected to polymerization by means of actinic light or catalyst, or actinic light and catalyst, or heating complete copolymerization of the monomer and castor oil ester into a flexible thermosetting solid is secured. It is believed that the unsaturated dicarboxylic acid cross links the polymer produced from the monomer having the group $H_2C=C<$.

It has been found that acyl chlorides readily react with the hydroxyl groups in the fatty acid portion of the castor oil to form esters with evolution of hydrogen chloride gas. For this purpose, a great number of aliphatic hydrocarbon acyl chlorides have been employed, wherein the length of the carbon chain may be varied from six to twenty carbon atoms in length. Mixtures of two or more acyl chlorides have been found to be quite satisfactory. The following typical acyl chloride compositions may be reacted with castor oil for the purpose of this invention:

*Table I*

A

| | Parts |
|---|---|
| Octadecanoyl | 93 |
| Hexadecanoyl | 6 |
| Octadecanoyl | 1 |

B

| | Parts |
|---|---|
| Octadecanoyl | 35 |
| Octadecadienoyl | 45 |
| Hexadecanoyl | 10 |
| Octadecanoyl | 10 |

C

| | Parts |
|---|---|
| Tetradecanoyl | 90 |
| Dodecanoyl | 5 |
| Hexadecanoyl | 5 |

D.

| | Parts |
|---|---|
| Decanoyl | 90 |
| Dodecanoyl | 7 |
| Octanoyl | 3 |

E

| | Parts |
|---|---|
| Octanoyl | 90 |
| Hexanoyl | 3 |
| Decanoyl | 7 |

In the examples all parts are by weight.

For the purpose of this invention, the proportion of the acyl chlorides may vary, in some cases, from less than one molecule of the acyl chloride to one molecule of castor oil to as much as two molecules of acyl chloride per molecule of castor oil. Since castor oil is essentially a glyceryl tri-ester of ricinoleic acid, there are three hydroxyl groups available for esterification. The softest and most flexible products are obtained where the acyl chloride has been reacted with two hydroxyl groups in each castor oil molecule. The thermoset final copolymers vary in the degree of three dimensional cross linking inversely to the proportion of acyl groups added. The addition of more than two acyl groups per castor oil molecule appears to hinder a thermoset copolymer product being attained. For many commercial applications, the most desirable copolymer resins having marked toughness and thermal stability are produced where the acyl chloride is reacted with approximately one hydroxyl group of each castor oil molecule. Optimum toughness and good flexibility appears to be secured with the tetradecanoyl esters. Furthermore, the moderately long carbon chain acyl chlorides that is, from 10 to 14 carbon atoms long, produce tougher resins, for the same degree of esterification, than those do the shorter or much longer carbon chain acyl chlorides. In most cases, the longer carbon chain acyl esters of castor oil are mechanically softer than the shorter carbon chain acyl esters.

It will be understood that in reacting a body of castor oil with acyl chlorides that a fraction of the hydroxyl groups may be esterified. Particularly good results have been obtained with from 0.8 to 1.6 mols of acyl chloride reacted with each mol of castor oil.

While maleic anhydride has been suggested previously as the reactant for esterifying the hydroxyl groups in the castor oil, other ethylene or olefinic alpha, beta-dicarboxylic acids, preferably as the anhydrides, may be employed. Examples are monochlormaleic, itaconic and citraconic anhydrides. The following example is a typical procedure for preparing the castor oil ester of this invention.

EXAMPLE

Into an enclosed reaction vessel equipped with a stirrer, a reflux column and means for introducing predetermined gases as an atmosphere, 100 parts by weight of castor oil and 25 parts by weight of a mixture of acyl chlorides containing 90% tetradecanoyl, 5% dodecanoyl and 5% hexadecanoyl chloride were placed. After a thorough mixing while cold, the acyl chloride and castor oil mixture was heated to a temperature of about 140° C. to 150° C. for a period of time of from one to three hours, a stream of nitrogen gas being constantly introduced and removed to eliminate the resulting hydrochloric acid gas. The reaction proceeds to substantial completion; and, when the nitrogen ceased to show any significant amounts of hydrochloric acid gas, the reaction was essentially complete. Thereafter, 20 parts maleic anhydride were added and the mixture reacted for two hours at a temperature of from 120° C. to 135° C. The product was a clear light yellow syrup of moderate viscosity.

It is undesirable in the above reaction to exceed temperatures of about 160° C., since the castor oil and maleic anhydride will tend to form full esters which are unsatisfactory for the purpose of the invention. The following equation is believed to represent the reaction of the monotetradecanoyl ester of castor oil with maleic anhydride:

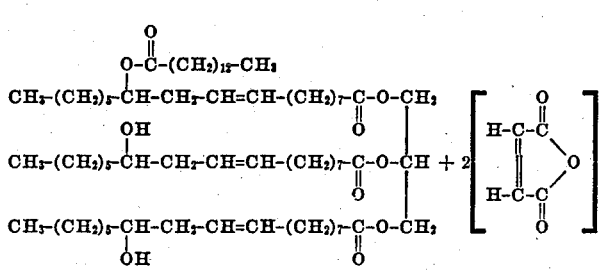 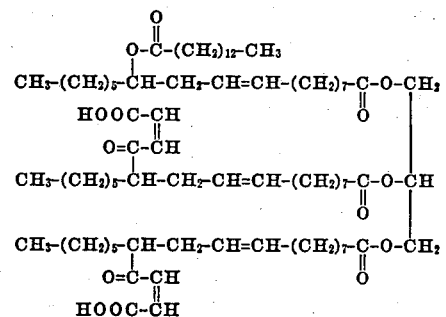

(Monotetradecanoyl-dimaleate of castor oil)

Castor oil has been reacted with maleic anhydride and acyl chlorides of various molecular weights over a wide range of proportions. The following table, based on 100 parts by weight of castor oil, indicates the relative proportions by weight of maleic anhydride to the acyl chloride employed in esterifying all the hydroxyl groups in the castor oil:

*Table II*

| Dodecanoyl Chloride | Maleic Anhydride | Castor Oil Weight | Durometer Hardness (50% Styrene Copolymer) |
|---|---|---|---|
| 19.4 | 20 | 100 | 96 |
| 27.2 | 16 | 100 | 80 |
| 31.1 | 14 | 100 | 76 |
| 34.9 | 12 | 100 | 43 |

| Tetradecanoyl Chloride | Maleic Anhydride | Castor Oil Weight | Durometer Hardness (50% Styrene Copolymer) |
|---|---|---|---|
| 25.1 | 20 | 100 | 89 |
| 30.1 | 18 | 100 | 83 |
| 35.1 | 16 | 100 | 76 |
| 40.2 | 14 | 100 | 58 |

| Octadecanoyl Chloride | Maleic Anhydride | Castor Oil Weight | Durometer Hardness (50% Styrene Copolymer) |
|---|---|---|---|
| 30.8 | 20 | 100 | 85 |
| 37.0 | 18 | 100 | 72 |
| 43.2 | 16 | 100 | 61 |
| 49.3 | 14 | 100 | -- |

In the above table all parts are parts by weight. Owing to the fact that the molecular weights of the acyl chlorides are generally greater than those of the maleic anhydride, a much greater proportion by weight of the acyl chloride is required than the weight of the maleic anhydride replaced. The full half-ester of castor oil and maleic anhydride requires approximately 30 parts by weight of maleic anhydride per 100 parts of castor oil.

The castor oil acyl and maleate half ester product is dissolved in a copolymerizable or reacting liquid polymerizable monomer having the group $H_2C=C<$. Examples of suitable monomers having this group are monostyrene, paramethylstyrene, parachlorostyrene, dichlorostyrene, vinyl acetate, methacrylic acid, allyl chloride, diallylphthalate, ethyl methacrylate and vinyl ketone. Mixtures of the monomers may be employed to secure desirable copolymer properties. In some cases the viscosity of the monomer may be controlled by admixing therewith selected amounts of the polymer thereof. Thus a small proportion of polystyrene dissolved in monostyrene will make a thicker monostyrene solvent.

For many purposes, it has been found that monostyrene is the preferred reactable solvent. When the castor oil ester of the example is dissolved in an equal amount by weight of monostyrene, the resulting solution is a low viscosity fluid suitable for impregnating coils, transformers, asbestos cloth, glass cloth and other materials. With one-half of one percent of benzoyl peroxide or other catalyst, the solution polymerizes rapidly at temperatures of 135° C. into a thermoset solid. Clear pore-free sheets, rods and other members are prepared by pouring this solution into suitable molds and heating. The action of ultra-violet light polymerizes the entire solution in a brief period of time into a thermoset solid. The thermoset solids produced in all cases were not brittle and did not crack or significantly deteriorate upon prolonged heating. The surfaces of the resinous polymers did not oxidize or change appreciably even after prolonged heating in air. The thermoset resin when heated at 175° C., did not soften or flow. Even after 20 hours at 250° C., the members were flexible and in good condition. These heat resisting properties are believed to be unusual. The thermoset polymer is insoluble in almost all the common solvents.

Using equal parts of the castor oil ester of the example with an equal part of vinyl acetate, after polymerization, a tough and flexible resin was obtained. When allyl chloride was combined in equal parts with the ester of the example, a tough varnish-like film having great flexibility was secured. With equal parts of ethyl methacrylate and the castor oil ester of the example, the copolymer was an elastic body with good film strength having excellent resistance to oxidation. In each of these examples, heating for eight to ten hours at 175° C. produced no significant deterioration.

The amount of polymerizable monomer having the group $H_2C=C<$ may be from 5 to 95 mols for 100 mols of the combined monomer and ester. In general, using less moles of the monomer having the group $H_2C=C<$ than the moles of castor oil ester, a soft flexible resin results and increasing the proportion of the liquid monomer yields a progressively harder resin.

A thermoset polymer prepared by reacting equal parts by weight of monostyrene and the ester of the example was tested electrically with the following results:

*Table III*

| Frequency | Power Factor 25° C., percent | Power Factor 80° C., percent |
|---|---|---|
| 100 c | 1.54 | 1.45 |
| 1 Kc | 1.65 | 2.61 |
| 10 Kc | 1.72 | 3.05 |
| 100 Kc | 1.88 | 2.79 |
| 500 Kc | 1.98 | 2.74 |
| 1 Kc | 1.95 | 2.68 |

A one-fourth inch thick sample of the same polymer had a dielectric strength of from 350 to 450 volts per mil. On a 1/16 inch thick member the dielectric breakdown strength was 600 volts per mil. Harder resins obtained by increasing the proportion of vinyl monomer had dielectric strengths of as high as 900 volts per mil. All the resins prepared with 50% by weight of styrene and each of the esters listed in Table II had a power factor of less than 1.0% at 125° C. at 100 kilocycles. For these copolymers the moisture absorption after 24 hours immersion at 25° C. was from about 0.177% to 0.286%.

By introducing the acyl group into the castor oil molecule, several important advantages are secured. The castor oil molecule is thereby permanently plasticized and, therefore, the resinous copolymer is much more stable than resins in which plasticizers are incorporated mechanically. For the same thermoset condition, the acidity of the castor oil ester and the final polymers is reduced as compared to esters containing only maleic anhydride and castor oil. An unexpected result is the increase of the thermal stability of the final thermoset resin by the introduction of long carbon chain aliphatic groups into the castor oil molecule.

The resins herein disclosed are particularly useful for treating electrical apparatus such, for example, as magnetic cores, electrical coils, transformers and other electrical apparatus that can be completely enclosed. The polymerizable solutions can be applied to insulate internal members from one another as well as to provide a weatherproof, highly insulating exterior covering. Magnetic cores may be bonded and insulated by applying to the laminations the solution of castor oil acyl-maleate ester in a monomer having the group $H_2C=C<$ and thereafter polymerizing the assembled laminations with the applied resin into a unitary body. Electrical coils, motor stators and transformers, and other members, may be evacuated and then impregnated with the resin solution and the resin solution completely polymerized. In some cases, the coil or other apparatus may be enclosed in a mold or a flexible shell and the liquid solution poured in and polymerized. A water-resistant and insulating coating and impregnant will be thus obtained. Since there is no inert, volatile material to remove the entire solution may be polymerized into a solid body without gas pockets, moisture evolution or other undesirable by-products.

In some cases, viscous solutions of castor oil ester and liquid monomer solvent may be combined with powdered mica, quartz, sand, glass, or ceramic particles or the like, to render the solutions still thicker and more thixotropic for bridging spaces in members to which they may be applied, as by dipping, plastering, or the like, upon the surface of members to form an encapsulating shell therearound and thereafter polymerized. If the uppermost portion of the shell is left incomplete or open after polymerization, a more fluid solution of the castor oil esters and monomer may be poured in and the filling polymerized. Weatherproof insulation capable of withstanding high temperatures without softening undesirably is thus secured.

Copper conductors covered with asbestos, glass fibers or cotton or other fibrous substances may be treated with the fluid castor oil ester solutions herein described; and, when the solutions have been polymerized to a thermoset state, a flexible surface insulation permitting winding and severe deformation will be obtained. Referring to Figure 1 of the drawing, the metallic conductor 10 is provided with a coating 11 of the resin which may be applied alone or in combination with fibrous materials.

By treating fibrous sheet materials, such as cotton cloth, paper, glass cloth, asbestos, and the like, with the resin solutions, the impregnated or coated sheet material may be molded into a unitary body under heat and pressure. The resulting laminate 12 is schematically shown in Figure 2 of the drawing. Thus thermoset laminated compositions having great flexibility may be produced for various applications. Slot cell insulation, panelboards, aircraft members such as fairings, shields, partitions, wing tabs and the like, and numerous other products may be thus made.

Mica flakes can be treated with the solution of the acyl-castor oil maleate to produce sheet mica insulation. By subjecting the treated mica sheets to heat and pressure a firmly bonded flexible sheet is produced. Reinforcing fabrics such as glass cloth, asbestos, or fish paper may be applied to one or both faces of the mica sheets. The flexible mica sheets may be used as a wrapping for coils, as slot cell liners and similar applications.

Since certain changes may be made in the above invention, and different embodiments of the invention could be made without departing from the scope thereof, it is intended that all matter contained in the above description shall be interpreted as illustrative and not in a limiting sense.

I claim as my invention:

1. A composition composed of the reaction product of castor oil with both an acyl halide having from 6 to 20 carbon atoms and an alpha, beta-olefinic dicarboxylic acid, the acyl halide and alpha, beta-olefinic dicarboxylic acid esterifying the major proportion of the hydroxyl groups of the castor oil, the castor oil and alpha, beta-olefinic dicarboxylic acid being reacted to produce only the acid half ester with at least one hydroxyl group on the average per castor oil molecule.

2. A composition composed of the reaction product of castor oil with a mixture of acyl halides having from 6 to 20 carbon atoms in an amount sufficient to esterify on the average of from 0.8 to 1.6 hydroxyl groups of each castor oil molecule, and an alpha, beta-olefinic dicarboxylic acid anhydride esterifying substantially all of the remaining hydroxyl groups of the castor oil, the castor oil and alpha, beta-olefinic dicarboxylic acid anhydride being reacted to produce only the acid half ester with at least one hydroxyl group on the average per castor oil molecule.

3. A composition composed of the reaction product of castor oil with an acyl halide having from 6 to 20 carbon atoms in an amount sufficient to esterify a substantial proportion of the hydroxyl groups of the castor oil not in excess of an average of two hydroxyl groups per molecule, and the resulting reaction product being further reacted with an alpha, beta-olefinic dicarboxylic acid anhydride to esterify substantially all the remaining hydroxyl groups of the castor oil, the castor oil and alpha, beta-olefinic dicarboxylic acid anhydride being reacted to produce only the acid half ester with at least one hydroxyl group on the average per castor oil molecule.

4. A composition composed of the reaction product of castor oil with an acyl halide having from 6 to 20 carbon atoms in an amount sufficient to esterify a substantial proportion of the hydroxyl groups of the castor oil not in excess of an average of two hydroxyl groups per molecule, and the resulting reaction product being further reacted with maleic anhydride to esterify substantially all the remaining hydroxyl groups of the castor oil, the reaction with maleic anhydride being so conducted that substantially only the acid half ester is produced.

5. A composition composed of the reaction product of castor oil with a mixture of acyl halides having from 6 to 20 carbon atoms in an amount sufficient to esterify a substantial proportion of the hydroxyl groups of the castor oil not in excess of an average of two hydroxyl groups per molecule and the resulting reaction product being further reacted with maleic anhydride to esterify substantially all the remaining hydroxyl groups of the castor oil, the reaction with maleic anhydride being so conducted that substantially only the acid half ester is produced.

6. A composition capable of being substantially completely copolymerized into a resinous solid composed of the reaction product of castor oil with an acyl halide having from 6 to 20 carbon atoms in an amount sufficient to esterify a substantial proportion of the hydroxyl groups of the castor oil not in excess of an average of two hydroxyl groups per molecule, and the resulting reaction product being further reacted with an alpha, beta-olefinic dicarboxylic acid to esterify substantially all the remaining hydroxyl groups of the castor oil to the acid half ester, and a reactable solvent for the reaction product, the solvent being composed of a liquid polymerizable monomer having the groups $H_2C=C<$.

7. A composition capable of being substantially completely copolymerized into a resinous solid composed of the reaction product of castor oil with both an acyl halide having from 6 to 20 carbon atoms and an alpha, beta-olefinic dicarmoxylic acid anhydride, the acyl halide and alpha, beta-olefinic dicarboxylic acid anhydride esterifying the major proportion of the hydroxyl groups of the castor oil, the acyl halide esterifying not in excess of an average of two hydroxyl groups per molecule and the dicarboxylic acid anhydride esterifying at least one hydroxyl group on the average per castor oil molecule the alpha, beta-olefinic dicarboxylic acid anhydride being so reacted with the castor oil as to produce substantially only the acid half ester, and a reactable solvent for the reaction product, the solvent being composed of a liquid polymerizable monomer having the group $H_2C=C<$, the mols of the solvent being from 5 to 95 for each 100 mols of combined solvent and reaction product.

8. A composition capable of being substantially completely copolymerized into a resinous solid composed of the reaction product of castor oil with an acyl halide having from 6 to 20 carbon atoms in an amount sufficient to esterify a substantial proportion of the hydroxyl groups of the castor oil not in excess of an average of two hydroxyl groups per molecule, and the resulting reaction product being further reacted with an alpha, beta-olefinic dicarboxylic acid anhydride to esterify substantially all the remaining hydroxyl groups of the castor oil to the acid half ester, and a reactable solvent for the reaction product, the solvent being composed of a liquid polymerizable monomer having the group $H_2C=C<$, the mols of the solvent varying from 5 to 95 for each 100 mols of combined solvent and reaction product.

9. A composition capable of being substantially completely copolymerized into a resinous solid composed of the reaction product of castor oil with an acyl chloride having from 6 to 20 carbon atoms in an amount sufficient to esterify a substantial proportion of the hydroxyl groups of the castor oil not in excess of an average of two hydroxyl groups per molecule, and the resulting reaction product being further reacted with maleic anhydride to esterify substantially all the remaining hydroxyl groups of the castor oil to the acid half ester, and a reactable solvent for the reaction product, the solvent being a liquid polymerizable monomer having the group $H_2C=C<$, the mols of the solvent being from 5 to 95 for each 100 mols of the combined solvent and reaction product.

10. The resinous body produced by interpolymerizing the reaction product of castor oil with an acyl chloride having from 6 to 20 carbon atoms in an amount sufficient to esterify an average of from 0.8 to 1.6 of the hydroxyl groups in each molecule of the castor oil, and the resulting reaction product being further reacted with maleic anhydride to esterify substantially all the remaining hydroxyl groups of the castor oil to the acid half ester, and a reactable solvent for the reaction product, the solvent being liquid polymerizable monomer having the group $H_2C=C<$, the mols of the solvent varying from 5 to 95 for each 100 mols of the combined solvent and reaction product.

11. The resinous body produced by interpolymerizing the reaction product of castor oil with an acyl halide having from 6 to 20 carbon atoms in an amount sufficient to esterify a substantial proportion of the hydroxyl groups of the castor oil not in excess of an average of two hydroxyl groups per molecule, and the resulting reaction product being further reacted with an alpha, beta-olefinic dicarboxylic acid anhydride to esterify substantially all the remaining hydroxyl groups of the castor oil to the acid half ester, and a reactable solvent for the reaction product, the solvent being composed of a liquid polymerizable monomer having the group $H_2C=C<$, the mols of the solvent varying from 9 to 95 for each 100 mols of combined solvent and reaction product.

12. In combination, an electrical conductor, and insulation applied to the electrical conductor, the insulation composed of the resinous body produced by interpolymerizing of castor oil with both an acyl chloride having from 6 to 20 carbon atoms and an alpha, beta-olefinic dicarboxylic acid anhydride, the acyl chloride and alpha, beta-olefinic dicarboxylic acid anhydride esterifying substantially all of the hydroxyl groups of the castor oil, the alpha, beta-olefinic dicarboxylic acid anhydride being so reacted with the castor oil as to produce substantially only the acid half ester, and a reactable solvent for the reaction product, the solvent being composed of a liquid polymerizable monomer having the group $H_2C=C<$, and a reactable solvent for the reaction product, the solvent being a liquid polymerizable monomer having the group $H_2C=C<$, the mols of the solvent being from 5 to 95 for each 100 mols of combined solvent and reaction product.

13. In combination, an electrical conductor, fibrous insulating material applied to the conductor and a thermoset resin applied to impregnate and bond the fibrous insulating material to the electrical conductors, the resin composed of the interpolymer of the reaction product of castor oil with an acyl chloride having from 6 to 20 carbon atoms in an amount sufficient to esterify a substantial proportion of the hydroxyl groups of the castor oil not in excess of an average of two hydroxy groups per molecule, and the resulting reaction product being further reacted with maleic anhydride to esterify substantially all the remaining hydroxyl groups of the castor oil to the acid half ester, and a reactable solvent for the reaction product, the solvent being liquid polymerizable monomer having the group $H_2C=C<$, the mols of the solvent being from 5 to 95 for each 100 mols of the combined solvent and reaction products.

HERBERT F. MINTER.

(References on following page)

REFERENCES CITED

The following references are of record in the file of this patent:

UNITED STATES PATENTS

| Number | Name | Date |
|---|---|---|
| 1,899,591 | Segar | Feb. 28, 1933 |
| 1,986,787 | Barrett | Jan. 8, 1935 |
| 2,117,255 | Priester | May 10, 1938 |
| 2,404,204 | Agens et al. | July 16, 1946 |

OTHER REFERENCES

Uses and Application of Chemicals and Related Materials, by Gregory, 1939, pp. 634 and 635.

Condensed Chemical Dictionary, 3rd edition, 1942, page 607.